(12) United States Patent
Sak (10) Patent No.: US 11,649,657 B2
(45) Date of Patent: May 16, 2023

(54) APPARATUS AND METHOD FOR ELECTRIC UTILITY LOCKOUT DEVICE

(71) Applicant: Jeff Sak, Boardman, OR (US)

(72) Inventor: Jeff Sak, Boardman, OR (US)

( * ) Notice: Subject to any disclaimer, the term of this patent is extended or adjusted under 35 U.S.C. 154(b) by 557 days.

(21) Appl. No.: 16/817,336

(22) Filed: Mar. 12, 2020

(65) Prior Publication Data
US 2021/0285261 A1 Sep. 16, 2021

(51) Int. Cl.
| | | |
|---|---|---|
| *E05B 73/00* | (2006.01) | |
| *E05B 67/38* | (2006.01) | |
| *A44B 11/25* | (2006.01) | |
| *H02G 1/02* | (2006.01) | |

(52) U.S. Cl.
CPC .......... *E05B 73/00* (2013.01); *A44B 11/2523* (2013.01); *E05B 67/383* (2013.01); *H02G 1/02* (2013.01)

(58) Field of Classification Search
CPC ... E05B 73/00; E05B 67/383; A44B 11/2523; H02G 1/02; Y10S 70/63; Y10T 70/40; Y10T 70/402; Y10T 70/404; Y10T 70/407; Y10T 70/409; Y10T 70/411; Y10T 70/5009; Y10T 70/5765; Y10T 292/20; Y10T 292/228; Y10T 292/23; Y10T 292/34; Y10T 292/37

See application file for complete search history.

(56) References Cited

U.S. PATENT DOCUMENTS

| | | | | |
|---|---|---|---|---|
| 972,535 | A * | 10/1910 | Hoover | |
| 1,463,776 | A * | 7/1923 | Knudtson | A01K 15/003 119/804 |
| 1,476,895 | A * | 12/1923 | Langenbacher | A01K 15/003 119/804 |
| 1,505,660 | A * | 8/1924 | Moersch | E05B 75/00 70/17 |
| 2,383,077 | A * | 8/1945 | Powell | E05B 75/00 70/17 |
| 5,778,709 | A * | 7/1998 | Hsu | B60R 25/0225 70/226 |
| 5,782,117 | A * | 7/1998 | Xavier | B60R 25/09 70/17 |
| 6,092,402 | A * | 7/2000 | Porcelli | E05B 67/383 70/58 |

(Continued)

FOREIGN PATENT DOCUMENTS

EP 0831199 A2 * 3/1998

*Primary Examiner* — Mark A Williams (57) ABSTRACT

A system and method for securing a locked-out component is provided. One embodiment slides a slidable blade of a lock out controller from a lockout position to a release position, wherein an inside connector between the slidable blade and a piston of a lock out attachment pushes the piston from a hook lock position to a hook extended position so that a hook is extended outward from the lock out attachment; coupling the hook to the locked-out component; and sliding the slidable blade of the lock out controller from the release position to the lockout position, wherein the inside connector coupled between the slidable blade pulls the piston from the hook extended position to the hook lock position, and wherein the hook is retracted substantially back into the interior of the lock out attachment so that the locked-out component that is coupled to the hook cannot be accessed by a tool.

20 Claims, 2 Drawing Sheets

(56) References Cited

U.S. PATENT DOCUMENTS

| | | | | |
|---|---|---|---|---|
| 7,866,321 | B2* | 1/2011 | DePetrillo | E05B 75/00 |
| | | | | 128/878 |
| 8,307,676 | B2* | 11/2012 | Irisawa | F41B 15/02 |
| | | | | 70/17 |
| 2008/0018463 | A1* | 1/2008 | Morrow | E05B 67/383 |
| | | | | 340/542 |
| 2011/0283753 | A1* | 11/2011 | Triffle | E05B 67/383 |
| | | | | 70/53 |
| 2014/0250955 | A1* | 9/2014 | Miller | G05G 5/28 |
| | | | | 70/174 |
| 2020/0208442 | A1* | 7/2020 | Ledgerwood | H03K 17/94 |

* cited by examiner

APPARATUS AND METHOD FOR ELECTRIC UTILITY LOCKOUT DEVICE

BACKGROUND OF THE INVENTION

In the arts of electric utility power systems, and in particular safety lock out devices, a variety of different and complex lock out devices are known that are operable to prevent inadvertent operation of a component in the electric utility power system.

An electric utility power system employs a variety of sub-systems that cooperatively provide electric power to a consumer. These sub-systems include power generation facilities that generate electric power, substation facilities that use transformers to alter voltage of the electric power and that use relays and breakers to provide protection to equipment, transmission power lines that transmit the generated electric power from the power generation facilities to the consumer's facility, and distribution facilities that deliver the electric power to the consumer. All of these various electric utility power sub-systems have many components that must be, from time to time, serviced by electric utility service personnel.

Safety of the electric utility service personnel is of paramount importance. Often, when the electric utility service personnel are working on various components of a particular electric utility power sub-system, the electric utility service personnel must coordinate their service activities among several different components. In some instances, the serviced components are energized (operating at a predefined design voltage and/or current). These energized components are referred to as being "hot" in the arts.

Safety procedures dictate that when a particular component is being serviced, that the component and other related components cannot be inadvertently operated by the electric utility service personnel. Such inadvertent operation may cause severe physical injury to the electric utility service personnel.

In the arts, a lock out device is attached to the one or more serviced components. The lock out device physically denies access to the locked-out component by the electric utility service personnel, thereby preventing the electric utility service personnel from inadvertently operating the component and/or from inadvertently attaching a tool to the locked-out component.

SUMMARY OF THE INVENTION

Embodiments of the lock out device provide a system and method for securing a locked-out component. An example embodiment slides a slidable blade of a lock out controller from a lockout position to a release position, wherein an inside connector of a connector assembly coupled between the slidable blade and a piston of a lock out attachment pushes the piston from a hook lock position to a hook extended position so that a hook is extended outward from the lock out attachment. Then, the hook is coupled to the locked-out component. Then, the slidable blade of the lock out controller is slid back from the release position to the lockout position, wherein the inside connector coupled between the slidable blade pulls the piston from the hook extended position to the hook lock position, and wherein the hook is retracted substantially back into the interior of the lock out attachment so that the locked-out component that is coupled to the hook cannot be accessed by a tool.

BRIEF DESCRIPTION OF THE DRAWINGS

The components in the drawings are not necessarily to scale relative to each other. Like reference numerals designate corresponding parts throughout the several views.

DETAILED DESCRIPTION

Figure 1:
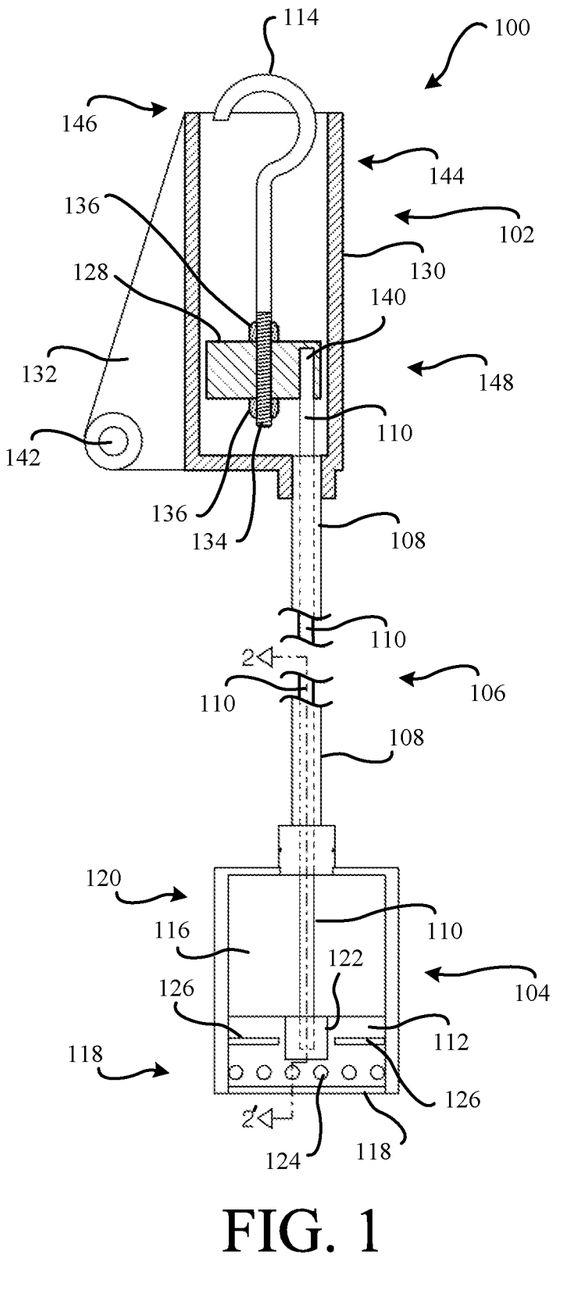
FIG. 1 is a cut away view of a lock out device comprising a lock out attachment and a lock out controller.
Figure 2:
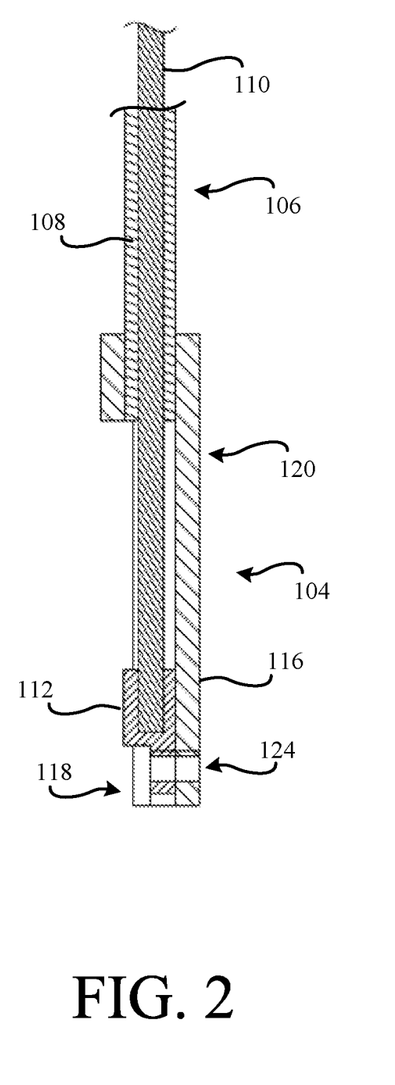
FIG. 2 is a cut away view of the lock out controller along the plane 2-2'.

FIG. 1 is a cut away view of a lock out device 100 comprising a lock out attachment 102 and a lock out controller 104. FIG. 2 is a cut away view of the lock out controller 104 along the plane 2-2'. Embodiments of the lock out device 100 provides a system and method for physically denying physical access to the locked-out component by the electric utility service personnel, thereby preventing the electric utility service personnel from inadvertently operating the component and/or from inadvertently attaching a tool to the locked-out component.

The disclosed lock out devices 100 will become better understood through review of the following detailed description in conjunction with the figures. The detailed description and figures provide merely examples of the various inventions described herein. Those skilled in the art will understand that the disclosed examples may be varied, modified, and altered without departing from the scope of the inventions described herein. Many variations are contemplated for different applications and design considerations; however, for the sake of brevity, each and every contemplated variation is not individually described in the following detailed description.

Throughout the following detailed description, examples of various lock out device 100 are provided. Related features in the examples may be identical, similar, or dissimilar in different examples. For the sake of brevity, related features will not be redundantly explained in each example. Instead, the use of related feature names will cue the reader that the feature with a related feature name may be similar to the related feature in an example explained previously. Features specific to a given example will be described in that particular example. The reader should understand that a given feature need not be the same or similar to the specific portrayal of a related feature in any given figure or example.

The following definitions apply herein, unless otherwise indicated.

"Substantially" means to be more-or-less conforming to the particular dimension, range, shape, concept, or other aspect modified by the term, such that a feature or component need not conform exactly. For example, a "substantially cylindrical" object means that the object resembles a cylinder, but may have one or more deviations from a true cylinder.

"Comprising," "including," and "having" (and conjugations thereof) are used interchangeably to mean including but not necessarily limited to, and are open-ended terms not intended to exclude additional, elements or method steps not expressly recited.

Terms such as "first", "second", and "third" are used to distinguish or identify various members of a group, or the like, and are not intended to denote a serial, chronological, or numerical limitation.

"Coupled" means connected, either permanently or releasably, whether directly or indirectly through intervening components.

In an exemplary embodiment, the lock out device 100 comprises a lock out attachment 102, a lock out controller 104, and a connector assembly 106. The connector assembly 106 comprises an outer connector 108 and an inner connector 110. The outer connector 108 is a hollow tube that slidably receives and retains the inner connector 110. A first end of the outer connector 108 is secured to the lock out attachment 102. The opposing end of the outer connector 108 is affixed to the lock out controller 104. The inner connector 110 couples the moving parts of the lock out attachment 102 to the moving parts of the lock out controller 104.

When the electric utility service personnel operates the lock out controller 104 by moving a slidable blade 112 in an upwards or outwards direction, the inner connector 110 extends the hook 114 outward from the lock out attachment 102 to an extended position. The hook 114 may then be positioned around a portion of the component that is to be locked out (interchangeably referred to herein as the locked-out component). When the electric utility service personnel retracts the slidable blade 112, the inner connector 110 pulls the hook 114 back into an interior region of the lock out attachment 102 such that the locked-out component is secured. The outer connector 108 serves to maintain the distance between the lock out attachment 102 and the lock out controller 104, while freely permitting the inner connector 110 to slidably control the position of the hook 114. The outer connector 108 also limits movement of the inner connector 110 only to a corresponding movement of the slidable blade 112. Accordingly, electric utility service personnel cannot inadvertently connect another tool to the locked-out component and/or inadvertently operate the locked-out component.

The lock out controller 104 comprises a blade retaining portion 116 that is configured to slidably retain the slidable blade 112 such that the slidable blade 112 may be moved from a lockout position 118 located at the lower end of the blade retaining portion 116 to a release position 120 located at an upper end of the blade retaining portion 116.

In an example embodiment, the blade retaining portion 116 includes outward extending side portions. The extending side portions have a channel, groove or the like disposed on an interior surface of the extending side portions. The channel, groove or the like receives and retains the side edges of the slidable blade 112 such that the slidable blade 112 may slide between the lockout position 118 and the release position 120 while being retained by the channel, groove or the like.

The slidable blade 112 comprises a connector retainer 122 that receives and secures one end of the inner connector 110. In a non-limiting example embodiment, a suitable adhesive, screw fastener, or pressure crimp may be used to secure the inner connector 110 into the connector retainer 122 of the slidable blade 112. Alternatively, or additionally, the ends of the inner connector 110 and the inside of the connector retainer 122 may be threaded for mating together.

The blade retaining portion 116 comprises an aperture to which the end of the outer connector 108 is secured to. Accordingly, the inner connector 110 extends therethrough to be secured to the slidable blade 112. The secured outer connector 108 slidably retains the inner connector 110 as the electric utility service personnel moves (slides) the slidable blade 112 from the retracted lockout position 118 to the extended release position 120.

During assembly, the back region of the blade retaining portion 116 does not have a back or lower side portion such that the slidable blade 112 may be inserted into the channel, groove or the like on the side portions of the blade retaining portion 116. When the end of the inner connector 110 is threaded through the outer connector 108, and is then secured to the connector retainer 122, one skilled in the art appreciates that the secured inner connector 110 prevents the slidable blade 112 from escaping the blade retaining portion 116 because when the piston 128 reaches its travel limit, further movement of the inner connector 110 is stopped by the closed end of the shell 130.

The lower end of the slidable blade 112 comprises one or more apertures 124 (holes). The lower end of the blade retaining portion 116 also comprises one or more holes 124. When the slidable blade 112 is in the retracted lockout position 118, the holes 124 of the slidable blade 112 and the holes 124 of the blade retaining portion 116 are aligned with each other. The electric utility service personnel may then extend a securing device through the aligned holes 124 to prevent the slidable blade 112 from inadvertently being moved from the lockout position 118 to the release position 120.

In some embodiments, a plurality of different diameter sized holes 124 may be used to facilitate securing with different types of securing devices. Accordingly, the blade retaining portion 116, which is secured in its retracted lockout position 118 in the lock out attachment 102, cannot be inadvertently extended to permit the hook 114 to release the captured locked-out component once the securing device is placed through one of the holes 124. Depending upon the preference of the electric utility service personnel, the securing device that is extended through the holes 124 may be a keyed mechanical lock, a zip tie, wire clamp or crimp, or another suitable securing device. Once installed, the securing device must be removed by the electric utility service personnel after a decision has been made by the electric utility service personnel to release the locked-out component which has been secured from inadvertent use by the retracted hook 114. Here, a particular diameter of the securing device may be accommodated by one of the different sized holes.

Alternatively, or additionally, the plurality of holes 124 may each be secured by a plurality of different electric utility service personnel for increased safety. For example, a first electric utility service personnel may use the lock out device 100 to capture and secure the locked-out component. Here, a first securing device is used to secure the slidable blade 112 in its lockout position 118. Then, a supervisor or other person may inspect the work of the electric utility service personnel who has captured the locked-out component using the lock out device 100, and if satisfied, the supervisor may further secure the slidable blade 112 by affixing their own second securing device to another hole 124 of the lock out controller 104. Accordingly, the electric utility service personnel cannot operate the slidable blade 112 so as to allow the hook 114 to release the captured locked-out component without the supervisor's approval. That is, both of the securing devices must be removed before the blade portion 116 may be slid from the lockout position 118 to the release position 120.

To facilitate securing the lock out controller 104 by multiple electric utility service personnel, color coded securing devices may be used so that the various electric utility service personnel may understand who has secured the slidable blade 112 using their particular color-coded securing devices. Alternatively, or additionally, the securing devices may include identifying (ID) labels or the like so that the ID labeled securing devices identify each individual electric utility service personnel.

In some embodiments, the slidable blade 112 comprises one or more finger tabs 126. The outwardly protruding finger tabs 126 may be grasped by the fingers of the electric utility service personnel so that the electric utility service personnel may grip the slidable blade 112. The electric utility service personnel may then slide the slidable blade 112 between the lockout position 118 and the release position 120.

Preferably, the slidable blade 112 and/or the blade retaining portion 116 are fabricated from an injection molded polymer. Alternatively, the slidable blade 112 and/or the blade retaining portion 116 may be fabricated out of metal. The slidable blade 112 and/or the blade retaining portion 116 may be made of a highly visible colored material so as to be readily discernible to the electric utility service personnel. Alternatively, or additionally, the slidable blade 112 and/or the blade retaining portion 116 may be painted with any desired color. Alternatively, or additionally, a colored and/or patterned adhesive film may be attached to the slidable blade 112 and/or the blade retaining portion 116. Accordingly, the highly visible lock out attachment 102 will give the electric utility service personnel a visible indication that access to the locked-out component is not available.

The lock out attachment 102 comprises the hook 114, a piston 128, and a shell 130. The shell 130 comprises an outward extending portion 132 (interchangeably referred to herein as the "ear" 132). The shell 130 is preferably enclosed on one end with an aperture for receiving and securing the outer connector 108. The other end of the shell 30 is open so as to permit extension and retraction of the hook 114.

The hook 114 is secured to the piston 128. In an example embodiment, the end of the shank 134 of the hook 114 is threaded such that self-locking nuts 136 or the like may be used to secure the hook 114 to the piston 128. In other embodiments, the shank 134 of the hook 114 may be secured to the piston 128 using any suitable means, such as an adhesive, a threaded screw, crimping, or the like.

During assembly, the inner connector 110 is inserted through the outer connector 108 and then into the interior of the shell 130. The outer connector 108 slidably retains the inner connector 110. The piston 128 comprises a connector retainer 140 that receives and secures the opposing end of the inner connector 110. A suitable adhesive, screw fastener, or pressure crimp may be used to secure the inner connector 110 into the connector retainer 140 of the piston 128. Alternatively, or additionally, the ends of the inner connector 110 and the inside of the connector retainer 140 may be threaded for mating together. The outer connector 108 may be similarly secured to the end of the shell 130.

The ear 132 includes a grasping or hooking means thereon that is accessible by a tool being used by the electric utility service personnel. Here, in the non-limiting example embodiment of the lock out attachment 102, the ear 132 includes an aperture 142 (hole 142) that is sized to be readily coupled to an end of a "hot stick" (not shown) that is used by the electric utility service personnel when the lock out device 100 is being used to capture and/or to release the locked-out component (not shown). In some embodiments, the grasping or hooking means may be another suitable structure that can be releasably attached to the electric utility service personnel's tool. For example, an optional ring or channel may be disposed around the outside surface of the shell 130 that can be grasped by a grasping type of tool. An unexpected advantage of the lock out device 100 is that the lock out attachment 102 can be designed to engage with and/or to be grasped by any particular tool that is being used by the electric utility service personnel. Accordingly, a lock out device 100 can be configured to secure and lock out any particular component of an electric utility system by selectively designing the lock out attachment 102 to be releasably grasped or secured by any particular tool of interest.

In practice, the electric utility service personnel couples their tool to the ear 132 of the lock out attachment 102. The electric utility service personnel then slides the blade portion 116 of the lock out controller 104 upwards or forward to the release position 120. As the slidable blade 112 is sliding upward or forward, the inner connector 110 also slides upwards or forward, thereby pushing the piston 128 upward or forward to the hook extended position 144. When the piston 128 is pushed into the hook extended position 144, the hook 114 extends outwardly beyond the end 146 of the shell 130. The electric utility service personnel may then move the hook 114 into a suitable location and/or orientation so that the hook 114 may be positions to grasp or otherwise secure the locked-out component that is to be captured.

Once the hook 114 is positioned about and/or is engaged with the locked-out component that is to be captured, the electric utility service personnel then pulls the slidable blade 112 back to the lockout position 118. As the slidable blade 112 is pulled backwards, the inner connector 110 is also pulled in a corresponding backwards direction. Accordingly, the piston 128 is pulled back to its hook lock position 148.

As the piston 128 is pulled back towards the hook lock position 146, the hook 114 is retracted back into the shell 130 along with the portion of the captured locked-out component that has been secured by the hook 114. When the hook 114 and piston 128 are in the hook lock position 146, the captured locked-out component cannot escape from the grasp of the hook 114. Then, since the slidable blade 112 is also in the lockout position 118, the electric utility service personnel may thread one or more of the securing devices through the aligned holes 124 of the lock out controller 104. Since the securing devices prevent the slidable blade 112 from moving out of the lockout position 118, the hook 114 securely retains the captured locked-out component.

In the various embodiments, the inner connector 110 is made of a rigid, or substantially rigid, material. The inner connector 110 may be solid or hollow. The outer connector 108 is preferably a hollow tube of a semi rigid, solid material. The outer connector 108 and the inner connector 110 are preferably made of a polymer or non-conductive material. However, the inner connector 110 may be hollow so long as the inner connector 110 is operable to move the piston 128 when the slidable blade 112 is moved by the electric utility service personnel.

Since the ends of the inner connector 110 are secured to both the slidable blade 112 of the lock out controller 104 and the piston 128 of the lock out attachment 102, movement in the slidable blade 112 induces an equal and corresponding movement of the piston 128. That is, the travel distance of the slidable blade 112 is the same as the travel distance of the piston 128.

Figure 3:
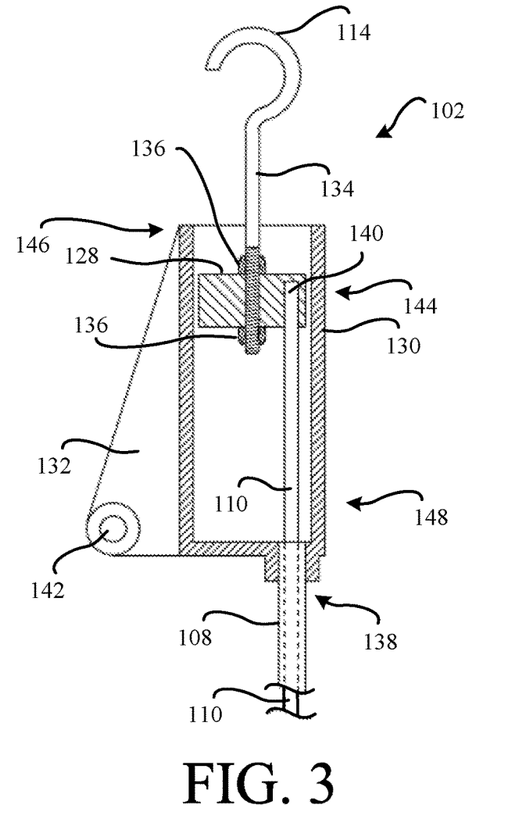
FIG. 3 is a cut away view of a lock out attachment with the hook in an extended position.
Figure 4:
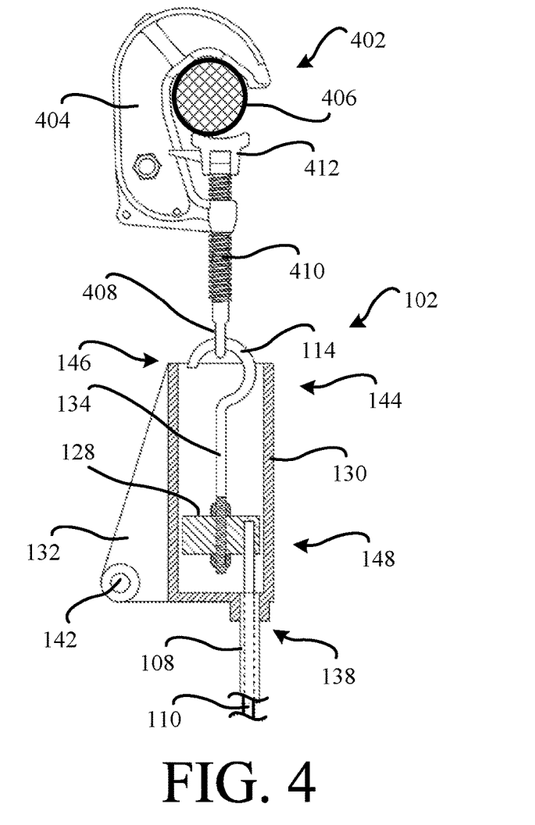
FIG. 4 is a cut away view of a lock out attachment with the hook in a retracted position securing a locked-out component.
Figure 5:
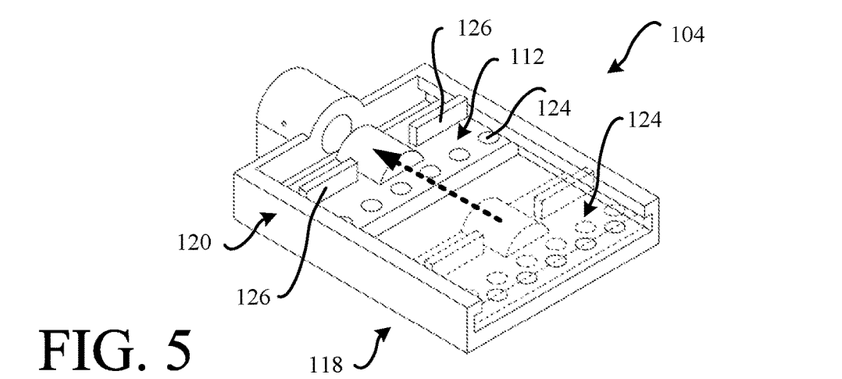
FIG. 5 is perspective view of the lock out controller.

FIG. 3 is a cut away view of a lock out attachment 102 with the hook 114 in an extended position. FIG. 4 is a cut away view of a lock out attachment 102 with the hook 114 in a retracted position securing a locked-out component 402. FIG. 5 is perspective view of the lock out controller 104.

One skilled in the art appreciates that the lock out attachment 102 may be configured to capture and secure any type of component. The example locked-out component 402 illustrated in FIG. 4 is known to be a grounding clamp 404 that is secured to a transmission line conductor 406 (shown in cross section). In practice, when the electric utility service personnel are working in proximity to the unenergized transmission line conductor 406, a grounding wire (not shown) is typically connected to the grounding clamp 404. The electric utility service personnel connect the grounding clamp 404 to the transmission line conductor 406 to draw off any residual charge from the transmission line conductor 406. In the event that the transmission line conductor 406 inadvertently becomes energized, the ground line will provide a path to ground, thereby protecting any electric utility service personnel that may be in proximity to the transmission line conductor 406.

To attach the grounding clamp 404 to the transmission line conductor 406, the electric utility service personnel attach a hot stick or other suitable tool to an aperture 408 disposed in the end of a threaded screw 410. As the electric utility service personnel rotate the threaded screw 410, a conductor clamp 412 is pushed upward towards the transmission line conductor 406. When the conductor clamp 412 engages the transmission line conductor 406, further tightening of the threaded screw 410 will secure the grounding clamp 404 to the transmission line conductor 406. After the grounding line is secured to a suitable earth ground point, a solid ground connection to the transmission line conductor 406 is established.

In practice, one skilled in the art appreciates that an inadvertent removal of the grounding clamp 404 from the transmission line conductor 406 might create a very dangerous condition for the electric utility service personnel who are working in proximity to the transmission line conductor 406. Accordingly, embodiments of the lock out device 100 may be used to secure the grounding clamp 404 to prevent the inadvertent removal of the grounding clamp 404 from the transmission line conductor 406.

After the grounding clamp 404 has been secured to the transmission line conductor 406, the electric utility service personnel uses their hot stick or other tool to engage the ear 132 of the lock out attachment 102. The electric utility service personnel then extends their hot stick or other tool towards the grounding clamp 404. At this juncture, the hook 114 has been extended outward from the shell 130 by sliding the slidable blade 112 of the lock out controller 104 from its lockout position 118 to the release position 120. That is, the piston 128 is pushed outward to the hook extended position 144.

The electric utility service personnel then inserts the hook 114 through the hole 408 in the threaded screw 410. By sliding the slidable blade 112 back to the lockout position 118, the inner connector 110 pulls the piston back to the hook lock position 148. As the piston is pulled back to the hook lock position 148, the hook 114 is drawn back into the interior of the shell 130. The end of the threaded screw 410 is also pulled back, at least partially, into the interior of the shell 130. The slidable blade 112 is then secured with a securing device to retain the hook 114 in the retracted position, thereby securing the grounding clamp 404. Since the hook 114 remains inserted through the hole 408 of the threaded screw 410, it is not possible for another tool to engage the grounding clamp 404 for removal.

In a preferred embodiment, the hook 114 is configured to spin freely within the piston 128. Accordingly, twisting of a portion of the lockout device 100, such as the lock out controller 104, might rotate the shell 130 and/or the piston 128, but the hook 114 will not rotate. That is, in a preferred embodiment, the hook 114 is optionally configured to spin freely within the piston 128 such that if the shell 130 and/or piston are rotated by a twisting a portion of the lockout device 100, the position of the hook 114 with respect to the locked-out component is substantially unchanged. Accordingly, the safety value of embodiments of the lock out device 100 is significantly increased in an unexpected manner since the likelihood that the hook 114 will become inadvertently disengaged from the locked-out component is decreased.

Depending upon the particular task at hand, any suitable length of the connector assembly 106 may be used in an embodiment of the lock out device 100. For example, if the captured locked-out component is a grounding device that is affixed to an overhead transmission line, a relatively long connector assembly 106 may be used. Preferably, in such an application, the length of the connector assembly 106 is greater that a safety clearance distance, approach boundary distance, or the like. Accordingly, an insulated hot stick or other insulated tool may be used by the electric utility service personnel (while they are preferably or optionally located beyond the safety clearance distance, approach boundary distance, or the like) to position and/or orient the lock out attachment 102 to capture the locked-out component. Then, the electric utility service personnel may operate the lock out controller 104 to secure the captured locked-out component while the electric utility service personnel is beyond the safety clearance distance, approach boundary distance, or the like.

Further, the length of the connector assembly 106 may be selected so that the lock out controller 104 can be operated by the electric utility service personnel at a convenient location. For example, the length of the connector assembly 106 may be such that the lock out controller 104 is located at ground level and/or at eye level while the lock out attachment 102 has secured the captured locked-out component.

In other situations, the length of the connector assembly 106 may be relatively short. For example, if the serviced component is a switch in a control panel or relay box, a lock out device 100 with a relatively short length of the connector assembly 106 may be used to secure the switch.

In some embodiments, the connector assembly 106 may be made from a plurality of interconnected sections. For example, one end of the outer connector 108 and the inner connector 110 may have a male thread and the other end of a different section of the connector assembly 106 may also have the outer connector 108 and the inner connector 110 with a corresponding female thread. Accordingly, the electric utility service personnel can select a plurality of connector assembly 106 sections that are screwed together so as to be able to define the desired length of the connector assembly 106.

Preferably, the connector assembly 106 is made of an insulative, non-conducting material. An unexpected advantage of such an embodiment is that the lock out device 100 may be used to secure captured locked-out components that are energized. Alternatively, some task may not require that the connector assembly 106 be insulated for safety reasons. Accordingly, the connector assembly 106 may be made of a suitable metal material. Such an example lock out device 100 may be suitable for locking out switches or other devices that do not pose an electrical hazard to the electric utility service personnel.

In some embodiments, the outer connector 108 is made of a colored material, or may be painted, so that the outer connector 108 is readily discernible to the electric utility service personnel. In many applications, the electric utility service personnel may be servicing other components that are in close proximity to the captured locked-out component. Alternatively, or additionally, the electric utility service personnel may be using tools in proximity to the highly visible outer connector 108. Accordingly, an unexpected advantage is that the electric utility service personnel may always be aware of the location of the highly visible outer connector 108.

It is appreciated that the sizes of the lock out controller 104 and the lock out attachment 102 may be varied so as to provide for a safety lock out for a variety of different components. In the field, the electric utility service personnel would have a variety of different sizes and types of lock out device 100. In some embodiments, different sizes and/or types of lock out attachments 102 and lock out controllers 104 can be coupled together as needed to fit the securing of the particular component of interest.

Preferably, the components of the lock out attachment 102 and/or the lock out controller 104 are made of the same or similar material so as to have same thermal expansion properties or characteristics. Similarly, the outer connector 108 and the inner connector 110 of the connector assembly 106, even if made of different materials than the lock out attachment 102 and/or the lock out controller 104, are made of materials having the same thermal expansion characteristics. Accordingly, as ambient temperatures vary, the operating characteristics of the components of the lock out attachment 102, the connector assembly 106, and the lock out controller 104 remain operable since the applicable components have the same, or at least similar, thermal expansion properties or characteristics in accordance to their function. For example, when the outer connector 108 and the inner connector 110 have the same thermal expansion properties, a change in the length due to thermal expansion or contraction of the inner connector 110 will be substantially the same as the change in length of the outer connector 108.

It should be emphasized that the above-described embodiments of the lock out device 100 are merely possible examples of implementations of the invention. Many variations and modifications may be made to the above-described embodiments. All such modifications and variations are intended to be included herein within the scope of this disclosure and protected by the following claims.

In an alternative embodiment, the hook 114 is replaced with a clamping device (not shown) with two opposing grabber hasps, interchangeably referred to herein as a hook for convenience. The opposing grabber hasps separate from each other (open) when the piston is extended to the extended position 144. When the opposing grabber hasps are retracted by moving the piston 128 to the lock position 148, the opposing grabber hasps close together and secure the locked-out component.

Furthermore, the disclosure above encompasses multiple distinct inventions with independent utility. While each of these inventions has been disclosed in a particular form, the specific embodiments disclosed and illustrated above are not to be considered in a limiting sense as numerous variations are possible. The subject matter of the inventions includes all novel and non-obvious combinations and subcombinations of the various elements, features, functions and/or properties disclosed above and inherent to those skilled in the art pertaining to such inventions. Where the disclosure or subsequently filed claims recite "a" element, "a first" element, or any such equivalent term, the disclosure or claims should be understood to incorporate one or more such elements, neither requiring nor excluding two or more such elements.

Applicant(s) reserves the right to submit claims directed to combinations and subcombinations of the disclosed inventions that are believed to be novel and non-obvious. Inventions embodied in other combinations and subcombinations of features, functions, elements and/or properties may be claimed through amendment of those claims or presentation of new claims in the present application or in a related application. Such amended or new claims, whether they are directed to the same invention or a different invention and whether they are different, broader, narrower or equal in scope to the original claims, are to be considered within the subject matter of the inventions described herein.

Therefore, having thus described the invention, at least the following is claimed:

1. A lock out device, comprising:
a lock out controller, comprising:
a blade retaining portion; and
a slidable blade,
wherein the slidable blade is retained within the blade retaining portion, and
wherein an electric utility service personnel may slide the slidable blade between a release position and a lockout position;
a lock out attachment, comprising,
a shell,
a piston disposed within an interior of the shell; and
a hook secured to the piston,
wherein the piston may be moved between a hook lock position and a hook extended position,
wherein when the piston is in the hook extended position, the hook extends outwardly from the shell, and
wherein when the piston is in the hook lock position, the hook is substantially retracted into the interior of the shell; and
a connector assembly, comprising:
an outer connector that is hollow, and
an inner connector that is slidably disposed within the outer connector,
wherein a first end of the inner connector is coupled to the slidable blade of the lock out controller and the opposing end of the inner connector is coupled to the piston of the lock out attachment, and
wherein the hook is configured to spin freely within the interior of the shell such that if the shell and the piston are rotated by a twisting of the connector, the position of the hook with respect to a locked-out component remains substantially unchanged.

2. The lock out device of claim 1,
wherein the hook is configured to couple to a portion of a component that is to be locked out, and
wherein in response to coupling the hook to a portion of the locked-out component and in response to pulling the hook back into the interior of the shell by moving the slidable blade from the release position to the lockout position, the locked-out component is secured by the hook and cannot be inadvertently removed using another tool.

3. The lock out device of claim 1,
wherein at least one of the blade retaining portion and the slidable blade of the lock out controller are made of a brightly colored material that is discernible by the electric utility service personnel.

4. The lock out device of claim 1,
wherein the inner connector is made of a first material and the outer connector of the connector assembly is made of a second material, and
wherein the first material and the second material have substantially a same thermal expansion property.

5. The lock out device of claim 1,
wherein shell of the lock out attachment is made of a brightly colored material that is discernible by the electric utility service personnel.

6. The lock out device of claim 1,
wherein the connector assembly is made of a brightly colored material that is discernible by the electric utility service personnel.

7. The lock out device of claim 1, wherein the lock out attachment further comprises:
an outward extending portion that extends outward from the shell,
wherein a tool that is used by the electric utility service personnel may be releasably coupled to the outward extending portion, and
wherein the electric utility service personnel uses the tool to couple the hook to a portion of the locked-out component.

8. The lock out device of claim 1,
wherein the slidable blade of the lock out controller includes at least one first hole,
wherein the blade retaining portion of the lock out controller includes at least one second hole,
wherein when the slidable blade is located in the lockout position, the first hole and the second hole align with each other such that the electric utility service personnel may extend a securing device through the first hole and the second hole, and
wherein the securing device extending through the first hole and the second hole prevents the slidable blade from being moved to the release position.

9. The lock out device of claim 8,
wherein the securing device is a first securing device,
wherein the slidable blade of the lock out controller further includes at least one third hole,
wherein the blade retaining portion of the lock out controller includes at least one fourth hole,
wherein when the slidable blade is located in the lockout position, the third hole and the fourth hole align with each other such that a supervisor may extend a second securing device through the third hole and the fourth hole, and
wherein the second securing device extending through the third hole and the fourth hole prevents the slidable blade from being moved to the release position.

10. The lock out device of claim 1,
wherein the slidable blade of the lock out controller includes a plurality of first holes,
wherein the blade retaining portion of the lock out controller includes a plurality of second holes,
wherein when the slidable blade is located in the lockout position, each one of the plurality of first holes and aligns with one of the plurality of second holes such that the electric utility service personnel may extend a securing device through a selected one of the plurality of first holes and the corresponding one of the plurality of second holes, and
wherein the securing device extending through the selected first hole and the corresponding second hole prevents the slidable blade from being moved to the release position.

11. The lock out device of claim 10,
wherein a size of at least one of the plurality of first holes in the slidable blade of the lock out controller is a different size than a size of another one of the plurality of first holes,
wherein the sizes of the plurality of second holes in the blade retaining portion of the lock out controller correspond to the sizes of the first holes, and
wherein a diameter of the securing device extending through the first hole and the second hole is selectable and may be extended through one of the first holes and the second holes based on the size of the selected first hole and the corresponding second hole.

12. The lock out device of claim 1, wherein the slidable blade of the lock out controller further comprises:
at least one outward extending portion that extends outward from the slidable blade,
wherein the outward extending portion may be grasped by the electric utility service personnel to slide the slidable blade between the release position and the lockout position.

13. The lock out device of claim 1, wherein the hook comprises two opposing grabber hasps, wherein the opposing grabber hasps open when the piston is in the hook extended position, and wherein the opposing grabber hasps close together to secure the locked-out component when the piston is retracted to the hook lock position.

14. A method of securing a locked-out component, comprising:
sliding a slidable blade of a lock out controller from a lockout position to a release position,
wherein an inner connector of a connector assembly coupled between the slidable blade and a piston of a lock out attachment pushes the piston from a hook lock position to a hook extended position, and
wherein a hook that is attached to the piston is extended outward from a shell of the lock out attachment as the piston moves to the hook extended position;
coupling the hook to a portion of the locked-out component; and
sliding the slidable blade of the lock out controller from the release position to the lockout position,
wherein the inner connector coupled between the slidable blade and the piston of the lock out attachment pulls the piston from the hook extended position to the hook lock position,
wherein the hook that is attached to the piston is retracted substantially back into an interior of the shell of the lock out attachment, and
wherein the portion of the locked-out component that is coupled to the hook cannot be accessed by a tool;
wherein the hook is configured to spin freely within the interior of the shell such that if the shell and the piston are rotated by a twisting of the connector, the position of the book with respect to the locked-out component remains substantially unchanged.

15. The method of claim 14,
wherein the slidable blade of the lock out controller includes at least one first hole,
wherein a blade retaining portion of the lock out controller includes at least one second hole,
wherein when the slidable blade is located in the lockout position, the first hole and the second hole align with each other, and the method further comprising:
extending a securing device through the first hole and the second hole to prevent the slidable blade from being moved to the release position.

16. The method of claim 15,
wherein the securing device is a first securing device,
wherein the slidable blade of the lock out controller further includes at least one third hole,
wherein a blade retaining portion of the lock out controller includes at least fourth one hole,
wherein when the slidable blade is located in the lockout position, the third hole and the fourth hole align with each other, and
the method further comprising:
extending a second securing device through the third hole and the fourth hole to further prevent the slidable blade from being moved to the release position.

17. The method of claim 14,
wherein at least one of a blade retaining portion and the slidable blade of the lock out controller are made of a brightly colored material that is discernable by an electric utility service personnel.

18. The method of claim 14,
wherein the inner connector is made of a first material and an outer connector of the connector assembly is made of a second material, and
wherein the first material and the second material have substantially a same thermal expansion property.

19. The method of claim 14,
wherein shell of the lock out attachment is made of a brightly colored material that is discernible by an electric utility service personnel.

20. The method of claim 14,
wherein the connector assembly is made of a brightly colored material that is discernible by an electric utility service personnel.

\* \* \* \* \*